United States Patent Office 3,413,301
Patented Nov. 26, 1968

3,413,301
PROCESS FOR PRODUCING PYRIDINE
DERIVATIVES
Tetsuo Maruyama, Toyonaka, Osaka, and Noriaki Toukai,
Mishima-gun, Osaka, Japan, assignors to Takeda Chemical Industries, Ltd., Osaka, Japan
No Drawing. Continuation of application Ser. No.
381,517, July 9, 1964. This application July 29,
1966, Ser. No. 568,974
Claims priority, application Japan, July 12, 1963,
38/38,096
6 Claims. (Cl. 260—295.5)

ABSTRACT OF THE DISCLOSURE

This invention relates to a process for producing pyridoxine (vitamin $B_6$) or intermediates that are used to produce pyroxidine. More specifically, this invention relates to a process for the production of a compound of the formula:

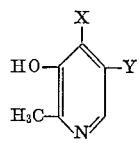

(I)

in which each of X and Y is carboxyl, alkoxycarbonyl, formyl, hydroxymethyl or halogenomethyl which comprises reacting a compound of the formula:

$$XCH=CHY \quad (II)$$

with a compound of the formula:

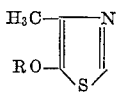

(III)

in which R is a hydrocarbon residue of 1 to 7 carbon atoms.

---

This application is a continuation of our parent application, Ser. No. 381,517 filed July 9, 1964, now abandoned.

This invention relates to a process for producing pyridoxine or intermediates that are used to produce pyridoxine.

Heretofore, various methods have been proposed for the production of pyridoxine which is well known as vitamin $B_6$. However, improvements in producing this compound on an industrial scale are required.

The present inventors have found that thiazole compounds are successfully employed in Diels-Alder reaction, and that by application of the new reaction pyridine derivatives are advantageously produced on an industrial scale. Such a fining is very interesting from the viewpoint of both the reaction mechanism and the practical use of the resulting compound.

The present invention provides a process for the production of a compound of the formula:

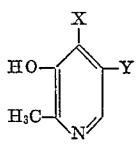

(I)

in which each of X and Y is carboxyl, alkoxycarbonyl, formyl, hydroxylmethyl, or halogenomethyl, and the group respectively represented by X or Y may be the same as or different from each other, which comprises reacting a compound of the formula:

$$XCH=CHY \quad (II)$$

with a compound of the formula:

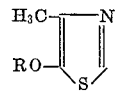

(III)

in which R is a hydrocarbon residue of 1 to 7 carbon atoms, and subsequent desulfurization. The pyridine Compound I, except when both X and Y in the compound are hydroxymethyl, can be converted to pyridoxine or a salt thereof by methods known per se, for example by reduction, or hydrolysis.

In the compound of the general Formula III, a hydrocarbon residue of 1 to 7 carbon atoms, which is represented by R, can be any alkyl, aralkyl or aryl group though such lower alkyl groups as methyl, ethyl, propyl and butyl or groups such as benzyl or phenyl are preferred.

Some specific examples of the compound represented by the general Formula II are mentioned in the following:

diethyl maleate, dimethyl maleate, diethyl fumarate, dimethyl fumarate, maleic acid anhydride, butenediol, maleoaldehyde, etc.

The present reactions may be shown by the following reaction scheme:

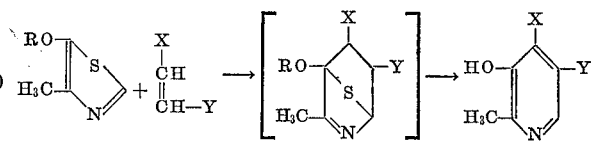

An additional reaction solvent is not always necessary, for the thiazole compound of the starting material may act as a reaction solvent, but if desired, any solvent which does not hinder the reaction may be used. Among the solvents which are used for this purpose, there may, for example, be alcohols such as methanol or ethanol, benzene, nitrobenzene, toluene, xylene or the like.

The other conditions such as reaction temperature and reaction time, should be suitably selected in accordance with the amount of the starting materials. Generally, the reaction times are shortened by heating.

In the present invention, profitable results may be obtained when the reaction is carried out under elevated pressure. Furthermore it is often the case that the present reaction can be accelerated by the presence of suitable catalyst or catalysts. As the catalysts which are conveniently employed in the present invention, there may, for example, be mentioned catalyst which may generally be employed in Friedel-Crafts reaction, such as aluminum chloride, zinc chloride or boron fluoride.

Some typical compounds which may be produced according to the method of the present invention are mentioned in the following:

2-methyl-3-hydroxypyridine-4,5-dicarboxylic acid;
2-methyl-3-hydroxy-4,5-dihydroxymethylpyridine;
2-methyl-3-hydroxypyridine-4,5-dialdehyde;
2-methyl-3-hydroxy-5-hydroxymethypyridine-4-aldehyde;
2-methyl-3-hydroxy-5-hydroxymethylpyridine-4-carboxylic acid; etc.

The product obtained need not necessarily be separated for its use as an intermediate in the production of pyridoxine, but can be converted directly to pyridoxine. However, if desired, it may be separated from the reaction mixture. For such a separation it is preferred to separate the compound in the form of a salt, preferably in the form of the hydrochloride by the addition of alcohol containing hydrochloric acid to the reaction mixture.

When each of X and Y in the product of the foregoing

Formula I is carboxyl, alkoxycarbonyl or formyl, the conversion of the compound to pyridoxine may be led by reduction, and when each of X and Y in the product is halogenomethyl, it may be led by hydrolysis. The reduction can be carried out by per se known methods, for example by hydrogenation in the presence of a catalyst, such as nickel, palladium, copper, iron, cobalt or platinum catalyst, or by using a reducing agent such as lithium aluminum hydride or sodium borohydride. The hydrolysis may also be led by per se known means.

The conversion of the compound to pyridoxine can be carried out in a suitable solvent. Examples of solvents which can be employed for this conversion are alcohols such as methanol and ethanol, hydrocarbons such as benzene, toluene and hexane, and ethers such as diethylether and dioxane. The reduction proceeds smoothly under atmospheric pressure at room temperature, but, if desired, the reduction may be accelerated by heating and/or using an elevated pressure.

If the pyridoxine obtained is in the free form, it may, if desired, be converted to the form of salt such as hydrochloride by means known per se.

The pyridoxine obtained by the method of the present invention can, if desired, be converted to pyridoxamine.

As explained above, pyridoxine can be obtained by the present invention using moderate conditions, and the reaction is completed in a short period of time. Moreover, pyridoxine is obtained in a high purity and a good yield. The following examples illustrate the invention.

EXAMPLE 1

A mixture of 10 grams of 4-methyl-5-ethoxythiazole and 12 grams of diethyl maleate, which was put in a sealed tube, was heated at 200° C. for 8 hours. After removing of the unreacted thiazole and the ester from the reaction mixture, the residue was refluxed with the addition of 5 cubic centimeters of hydrochloric acid until the formation of hydrogen disulfide ceased.

After the excess hydrochloric acid was removed from the obtained mixture under reduced pressure, 30 cubic centimeters of acetone was added thereto, then the acetone solution was cooled to obtain 2.3 grams of 2-methyl-3-hydroxypyridine-4,5-dicarboxylic acid melting at 245–247° C. (with decomposition). In consideration of the recovered starting thiazole compound, the yield amounts to 63.5%.

EXAMPLE 2

In a manner similar to that described in Example 1, 10 grams of 4-methyl-5-ethoxythiazole and 12 grams of diethyl fumarate were treated to produce 2-methyl-3-hydroxypyridine-4,5-dicarboxylic acid.

EXAMPLE 3

In a manner similar to that described in Example 1, 10 grams of 4-methyl-5-ethoxythiazole and 6.6 grams of maleic acid anhydride were treated to produce 2-methyl-3-hydroxypyridine-4,5-dicarboxylic acid.

EXAMPLE 4

5 grams of 4-methyl-5-ethoxythiazole, 5 grams of butenediol and 1 gram of anhydrous aluminum chloride were dissolved in 10 cubic centimeters of nitrobenzene. The solution was heated at 100° C. for 5 hours. After completion of the reaction, 100 cubic centimeters of water were added under cooling to the reaction mixture to decompose the excess aluminum chloride. 5 cubic centimeters of hydrochloric acid were added to the water layer, and after the mixture was refluxed until the formation of hydrogen disulfide ceased, and then it was concentrated and dried.

Then the residue was neutralized with 25% aqueous ammonia solution and aluminum hydroxide was filtered off. The obtained filtrate was adjusted to pH 3 with hydrochloric acid and then the solution was concentrated and dried. After 100 cubic centimeters of ethanol were added to the obtained residue, the obtained solution was warmed, and insoluble ammonium chloride was filtered off. The measurement of $Rf$ value of the filtrate by means of paper-chromatography showed the $Rf$ value of pyridoxine hydrochloride, and the filtrate turned to blue by the addition of Gibbs' reagent (2,6-dichloroquinone chlorimide).

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A process for the production of a compound of the formula

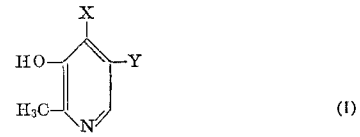

(I)

in which each of X and Y is a member selected from the group consisting of carboxyl, alkoxycarbonyl, aldehyde, hydroxymethyl and halogenomethyl, which comprises heating a compound of the formula $$XCH{=}CHY \qquad (II)$$

with a compound of the formula

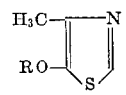

in which R is a hydrocarbon residue of 1 to 7 carbon atoms at a temperature of 100° to 200° C., and subjecting the resultant intermediate to the action of HCl to remove S therefrom.

2. A process according to claim 1, wherein Compound II is diethyl maleate and Compound I is 2-methyl-3-hydroxypyridine-4,5-dicarboxylic acid.

3. A process according to claim 1, wherein Compound II is diethyl fumarate and Compound I is 2-methyl-3-hydroxypyridine-4,5-dicarboxylic acid.

4. A process according to claim 1, wherein Compound II is maleic acid anhydride and Compound I is 2-methyl-3-hydroxypyridine-4,5-dicarboxylic acid.

5. A process according to claim 1, wherein Compound II is butenediol and Compound I is 2-methyl-3-hydroxy-4,5-dihydroxymethylpyridine.

6. A process according to claim 5, wherein R is lower alkyl.

References Cited

UNITED STATES PATENTS 3,227,722   1/1966   Pfister et al. _____ 260—297.5

OTHER REFERENCES

Harris et al: Journal of Organic Chemistry, vol. 27, (1962), pp. 2705–6.

Lowy: An Introduction To Organic Chemistry, Wiley 6th ed. (1945) pp. 213–215.

Katritzky et al.: Heterocyclic Chemistry, Wiley, 1st edition, 1960, pp. 220–1.

HENRY R. JILES, *Primary Examiner.*

A. L. ROTMAN, *Assistant Examiner.*